United States Patent
Polychronidis

(10) Patent No.: US 11,202,180 B2
(45) Date of Patent: Dec. 14, 2021

(54) SYSTEM AND METHOD FOR DUAL NOTIFICATIONS AND RESPONSES

(71) Applicant: iCrypto, Inc., Beaverton, OR (US)

(72) Inventor: Vasilis Polychronidis, Sammamish, WA (US)

(73) Assignee: iCrypto, Inc., Beaverton, OR (US)

( * ) Notice: Subject to any disclaimer, the term of this patent is extended or adjusted under 35 U.S.C. 154(b) by 0 days.

(21) Appl. No.: 16/489,215

(22) PCT Filed: Mar. 16, 2018

(86) PCT No.: PCT/US2018/022810
§ 371 (c)(1),
(2) Date: Aug. 27, 2019

(87) PCT Pub. No.: WO2018/170367
PCT Pub. Date: Sep. 20, 2018

(65) Prior Publication Data
US 2020/0008021 A1  Jan. 2, 2020

Related U.S. Application Data

(60) Provisional application No. 62/473,176, filed on Mar. 17, 2017.

(51) Int. Cl.
| | |
|---|---|
| H04W 4/14 | (2009.01) |
| H04W 4/80 | (2018.01) |
| G06F 9/54 | (2006.01) |
| H04L 9/32 | (2006.01) |
| H04L 12/66 | (2006.01) |
| H04L 12/58 | (2006.01) |
| H04L 29/06 | (2006.01) |

(52) U.S. Cl.
CPC .............. *H04W 4/14* (2013.01); *G06F 9/542* (2013.01); *H04L 9/3213* (2013.01); *H04L 12/66* (2013.01); *H04L 51/24* (2013.01); *H04L 63/08* (2013.01); *H04W 4/80* (2018.02)

(58) Field of Classification Search
CPC combination set(s) only.
See application file for complete search history.

(56) References Cited

U.S. PATENT DOCUMENTS

| | | | |
|---|---|---|---|
| 6,643,355 B1 | 11/2003 | Tsumpes | |
| 7,747,695 B1 | 6/2010 | Morris | |
| 10,142,297 B2 * | 11/2018 | Lin | ........................... H04L 9/14 |

(Continued)

OTHER PUBLICATIONS

International Search Authority (ISA), "International Search Report," International Application No. PCT/US2018/022810, dated Jun. 6, 2018, 2 pages, publisher Commissioner for Patents—PCT, United States of America.

(Continued)

*Primary Examiner* — Steven S Kelley
(74) *Attorney, Agent, or Firm* — Fogarty LLP

(57) ABSTRACT

A system and method using both SMS and push notifications in parallel to ensure that a notification to a mobile device arrives quickly and reliably at the correct application on the device and to ensure that the application can respond on any channel, thereby, providing the highest probability that the notification will be received by the application and that the response is sent and received by the origin server in timely manner.

4 Claims, 2 Drawing Sheets

(56) References Cited

U.S. PATENT DOCUMENTS

| | | | |
|---|---|---|---|
| 10,553,040 B2* | 2/2020 | Lei | H04W 12/10 |
| 2012/0311045 A1 | 12/2012 | Sylvain | |
| 2013/0304833 A1* | 11/2013 | St. Clair | H04L 51/00 |
| | | | 709/206 |
| 2014/0057599 A1* | 2/2014 | Hazari | H04W 12/0602 |
| | | | 455/411 |
| 2014/0172992 A1 | 6/2014 | Frederick | |
| 2015/0019645 A1 | 1/2015 | Wheeler | |
| 2015/0172919 A1* | 6/2015 | Basnayake | H04W 4/029 |
| | | | 455/411 |
| 2016/0165036 A1* | 6/2016 | Leow | H04B 1/385 |
| | | | 455/557 |

OTHER PUBLICATIONS

International Search Authority (ISA), "Written Opinion," International Application No. PCT/US2018/022810, dated Jun. 6, 2018, 3 pages, publisher Commissioner for Patents—PCT, United States of America.

* cited by examiner

US 11,202,180 B2

SYSTEM AND METHOD FOR DUAL NOTIFICATIONS AND RESPONSES

CROSS-REFERENCE TO RELATED APPLICATIONS

This application claims the benefit of the filing date of U.S. Provisional Patent Application No. 62/473,176, which was filed Mar. 17, 2017, the disclosure of which is hereby incorporated by reference herein in its entirety.

BACKGROUND

Mobile Internet and data usage is a routine activity for smartphone and tablet computer users. Globally, mobile data traffic is steadily increasing each year as networks are upgraded to support data service and more users are added. In addition to Internet browsing, content streaming, and other uses, mobile data networks also support additional services that are not apparent to users, such as notifications and messaging. Unfortunately, mobile networks are not always reliable and, therefore, notifications and messages do not always arrive at the users' mobile device.

SUMMARY OF THE INVENTION

Embodiments of the invention provide dual notifications to a mobile device to increase the likelihood of notifications reaching the device. In one embodiment, the system uses one or more data channels and the Short Message Service (SMS) channel in parallel to increase the reliability of sending and receiving notifications to and from an application on a mobile device. A token may be incorporated in the notifications to allow the receiving application to validate the source of the notification. The token may allow the receiving application to identify all notifications for the same event arriving over different channels and/or to identity all notification for the same event arriving at separate times. The token may be encrypted.

The system may use one or more data channels and SMS to respond to a notification. In some embodiments, multiple data paths are used to send the notifications and/or to receive the responses without using an SMS channel.

BRIEF DESCRIPTION OF THE DRAWINGS

Figure 1:
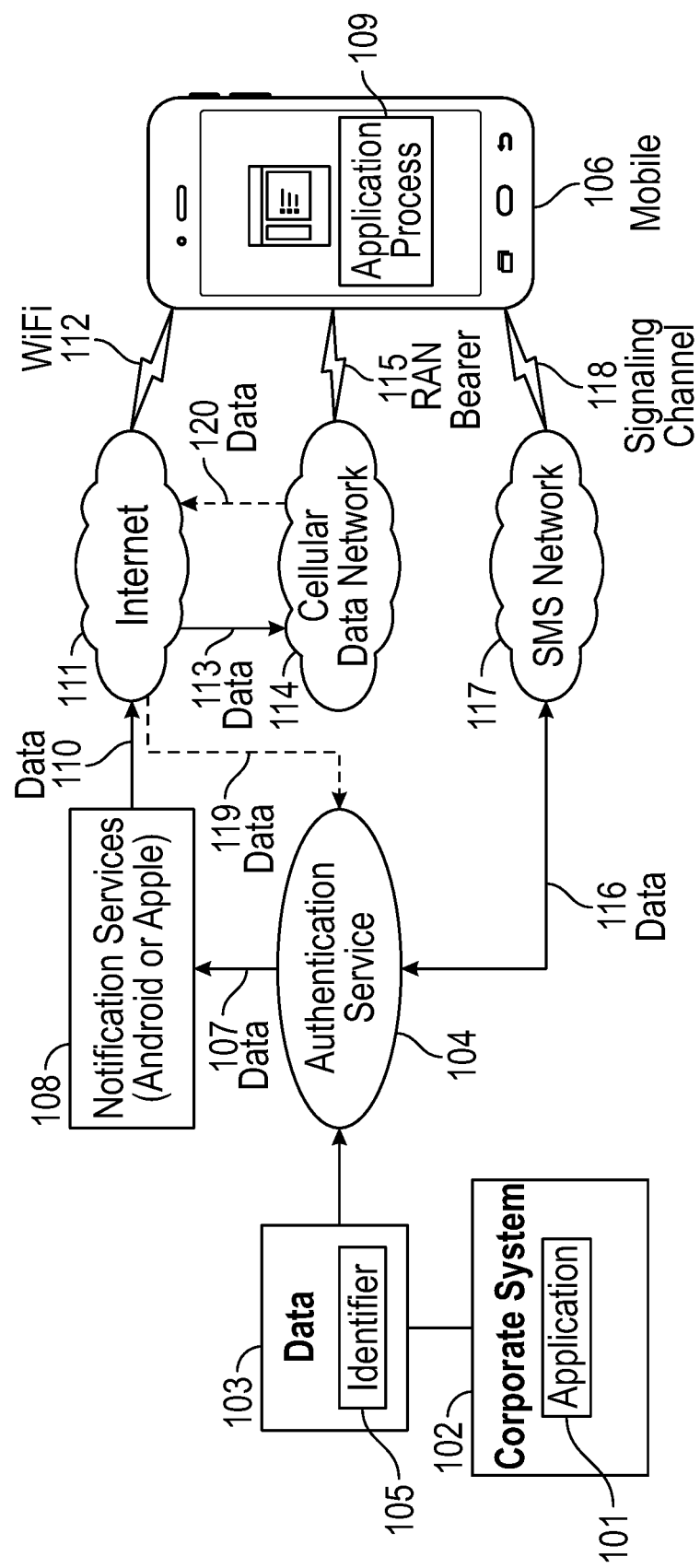

Having thus described the invention in general terms, reference will now be made to the accompanying drawings, wherein:

FIG. 1 is a block diagram illustrating one embodiment of a dual notification system.

Figure 2:
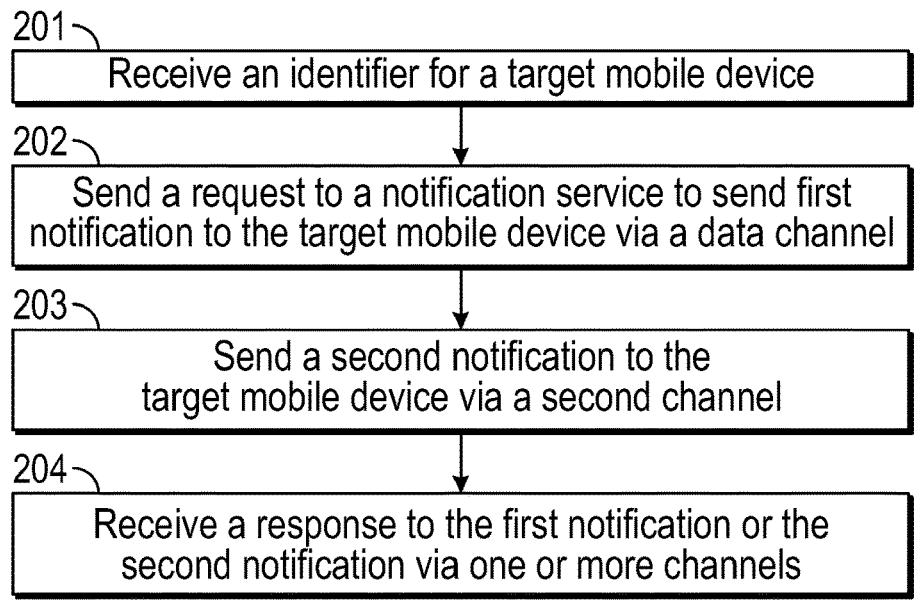

FIG. 2 is a flowchart illustrating an example process for providing dual notifications to a mobile device.

Figure 3:
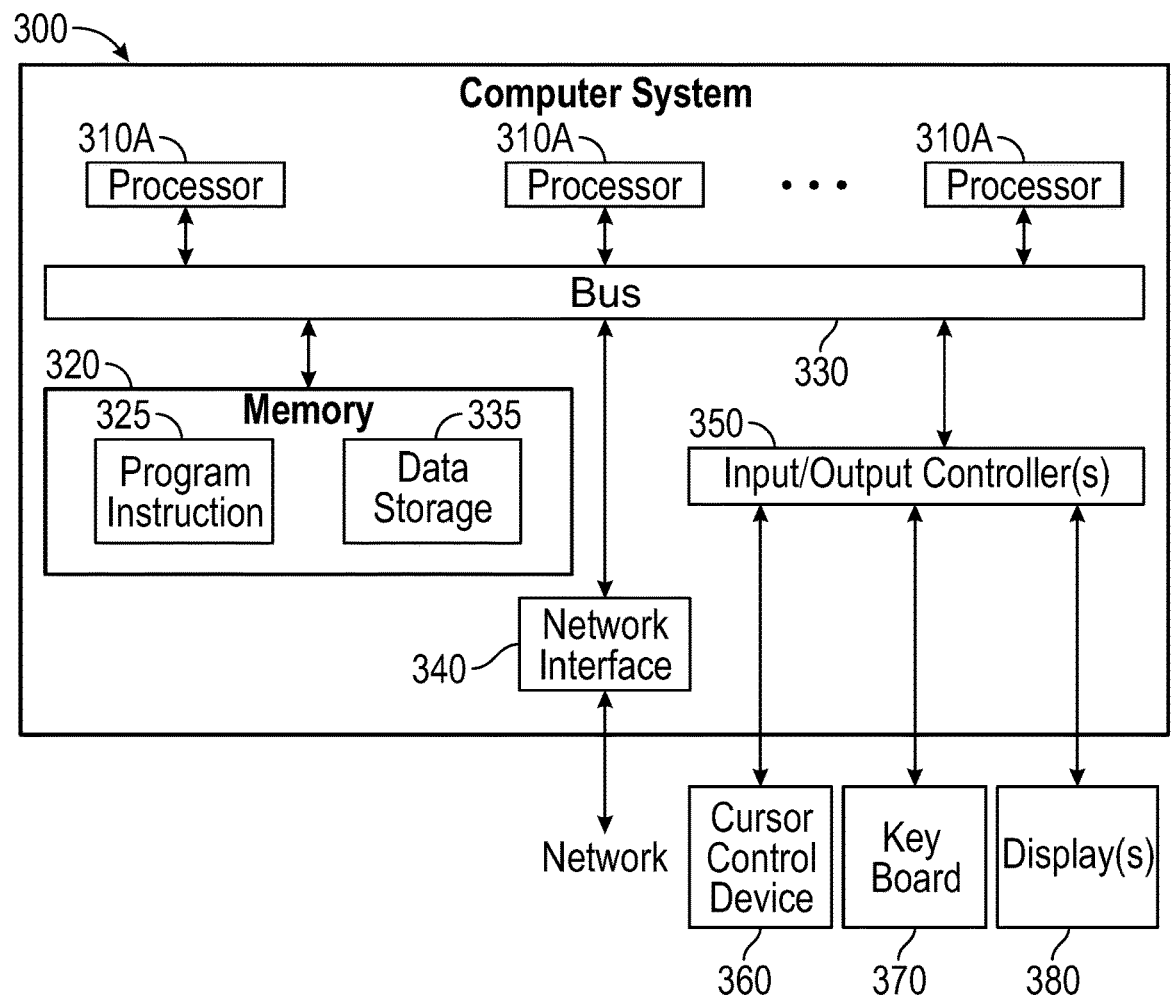

FIG. 3 is an example schematic of a computer system in accordance with some embodiments.

DETAILED DESCRIPTION

The invention will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The following terms are used in the examples set forth in the description below and have the following meaning in the example embodiments:

Mobile device—typically refers to a mobile telephone or smartphone but may also be a vehicle, tablet computer, laptop computer, television, or any device that is connected to a network by a fixed or wireless data channel. For the purposes of this invention, the mobile device also supports Short Message Service (SMS) capability over any bearer channel.

Biometric sensor—refers to a scanner, sensor, or detector on the mobile device that is used to read any biometric features, including, but not limited to, an iris scanner, facial recognition, ultrasonic fingerprint scanner, heart monitoring, and voice recognition. In some examples, the biometric sensor may be a fingerprint scanner that is used to read the fingerprint of a user.

Login—refers to the process of authenticating a user to an application. For the purposes of this invention, this may also include, but is not limited to, re-authentication during a session with an application to re-affirm the user identity, confirmation of the user identity for the purposes of non-repudiation of a transaction or access, and confirmation of the user identity for purposes of authentication when calling another party (e.g., calling into a customer service desk)

Push notifications to a mobile device are well understood in the art and are widely deployed. A push notification is a message that is "pushed" from backend server or application to a user interface, such as a mobile application. Push notifications use whatever TCP/IP data channel is available on the mobile device. For applications such as login authentication or user-identity confirmation, the mobile device is used to support an application that is not running on the device itself, but instead is running on a backend server on a remote network.

In an example embodiment, a user wishes to log in to a corporate system or enterprise network using a terminal, a computer or a mobile device. Regardless of how the user is accessing the corporate system, the corporate system may require the user to scan their fingerprint on the mobile device to verify the user's identity. The corporate system will send a notification to the mobile device associated with the user to request such a scan or biometric confirmation of identity. It cannot be assumed that a data channel, needed for the push notification between the user's mobile device and the corporate system will be sufficiently stable or that a data channel for the user's mobile device will even exist at all. In many mobile networks around the world, the data channel used by a mobile device is unreliable. As a result, push notifications from the corporate system may not reach the mobile device. For example, the user's mobile device may be inside a building where coverage is too poor to support a reliable data connection. Alternatively, the mobile device may be connected to a local WiFi network having firewalls or other network devices that prevent notifications from reaching the device. In other embodiments, the data channel may be available, but a notification server provided by a third-party (for example Google or Apple), maybe overloaded, may have connection problems, or may have failed. In these situations, a second channel for the push notification would reduce the probability that the mobile device is unreachable and increases the chances of the notification reaching the mobile device. In the example above, if the user cannot verify their identity via the mobile device's fingerprint reader, then either the user's access to the corporate system may be blocked or other fallback authentication methods may be used. Typically, such fallback authentication methods are inherently less secure and thereby increase the security risks to the application.

The dual notification system disclosed herein reduces the chances of a remote application being unable to contact a mobile device by using both data push notifications and binary SMS. An application on the mobile device is configured to understand that it could receive two notifications for the exact same action. A common event identifier is a simple, well known technique that is used to correlate two notifications for the same action. For example, both Apple and Google provide data push notification services that can be used for their respective environments. These push services are provided on a "best effort" basis. The push services are not guaranteed to reach the mobile device and do not have latency limits. Push notifications may be significantly delayed by system outages, system overload, or any manner of configuration settings by the sending organization. SMS messages may be similarly delayed or lost. SMS text messaging is also a "best effort" service and is subject to similar overload or failure conditions. By combining the use of both channels (i.e., push notifications and SMS messages), the probability of a notification not reaching the mobile device is significantly reduced since the data channel and SMS are provided by very different technologies and networks. There is little, if any, overlap between the data channel and SMS infrastructures, which ensures that a problem in one service is not propagated to the other. The likelihood of both the data channel and SMS networks experiencing an outage or significant delays at the same time is very remote. This results in a very robust and diverse notification method.

The dual notification system also supports a response channel via either SMS or the data channel. Either channel can be used for the response from the mobile device regardless of which channel was used to receive the original notification. This is especially useful given the transient nature of data channels especially in less-developed areas or countries. The data channel may have been sufficient for the mobile device to receive the original notification, but the data channel may have quickly degraded before the response could be entered by the user and sent from the mobile device. In this scenario, the application on the mobile device will use the SMS channel to send a response. In the login example described above, the user is prevented from logging into an application or service until the response is received at the corporate system. Any delays in processing or transmitting the response will create a degraded user experience for the login or may trigger the fallback authorization, which increases security risk. The usability of the authentication process is directly impacted by the speed at which the transaction with the mobile device can be undertaken and completed.

The amount of data needed for authentication or user verification is very small and is easily carried via binary SMS to and from the device.

Both data channels and SMS channels can experience significant delays in processing a message. Under extreme circumstances, the delay can be hours or a day or more. The dual notification process tracks the notifications to ensure that delayed notifications on one channel are not processed if a matching notification on the other channel has already been processed. During the intervening time, many aspects of the state of the device and the authentication process may have changed. It is important for the device and application to acknowledge all notifications to prevent the notification system from retrying the notification. Such retries could cause a notification storm that would overwhelm the system.

The source of all notifications must be assured. If a malicious source managed to send counterfeit notifications, the authentication process could be compromised. In one embodiment, each notification contains a token. The token may be encrypted and is used to confirms the source. The token may include notification sequence numbers. This information is used by the client application to ensure that only one notification for the event is processed and that it truly was sent by the trusted source.

FIG. 1 is a block diagram illustrating one embodiment of a dual notification system. Application 101 on corporate system 102 detects a need to authenticate a user, such as during a logon process. Corporate system 102 may be any public or private network or server, such as an enterprise network associated with a business entity. Application 101 sends data 103 to an authentication service 104. Data 103 may be formatted using any known protocol. Data 103 contains an identifier 105, such as a token, phone number, or any other agreed upon identification mechanism, that defines a target user at mobile device 106. Although the example embodiment refers to authentication service 104 as the entity initiating the dual notifications to mobile device 106, it will be understood that embodiments are not limited to authentication or login scenarios and that any backend application or service may trigger the dual notifications as disclosed herein. Authentication service 104 may be an application executing on a server or processor within corporate system 102. Alternatively, authentication service 104 may be a third-party service executing on a server or processor remote from corporate system 102.

Authentication service 104 sends data 107 to notification service 108 (e.g., Android or Apple notification service) using the appropriate protocol specified by that notification service. An application process 109 on the target mobile device 106 is associated with authentication service 104 and/or application 101. Authentication service 104 selects a particular notification service 108 based on the device type for mobile 106. The device type may be provided to authentication service 104, for example, when mobile device 106 downloads the application process 109, such as part of a user on-boarding process.

Notification message 107 is sent to mobile device 106 by authentication service 104 via notification service 108. Notification message 107 is processed by the appropriate service (e.g., an Android (Google) service or an Apple service) in notification services 108, which then provides notification data 110 to Internet 111. Internet 111 sends the notification message to mobile device 106 using WiFi channel 112. It will be understood that Internet 111 and WiFi channel 112 may comprise a plurality of routers and data connections to provide a public or private wireless local area network.

Alternatively, such as when WiFi channel 112 has failed, Internet 111 sends notification data 110 mobile device 106 by forwarding data 113 through a cellular data network 114, such as a GSM, CDMA, or LTE network. The notification message is then sent to mobile device 106 via a Radio Access Network (RAN) channel 115.

Accordingly, mobile device 106 may receive the notification message from either WiFi channel 112 or cellular data network 114 or both. The notification messages are addressed to mobile device 106 and application process 109. Application process 109 processes the received notification messages, but will use only the first notification message received if multiple related notifications arrive at mobile device 106.

Authentication service 104 also sends data 116 to the Short Message Service network 117 using a binary SMS message structure. SMS network 117 may be a cellular service provider network, for example. Data 116 is typically a Short Message Peer to Peer (SMPP) message but may be any protocol supported by the SMS network 117. The notification messages 107 and 116 from application service 104 contain a common event identifier that allows the destination application process 109 to process only one of the notifications that it receives. The common event identifier also enables application process 109 to verify that authentication service 104 is the source of a received message. SMS network 117 responds to authentication service 104 using the mobile originating message process using known protocols, such as SMPP for data 116. SMS network 117 will deliver the notification message to mobile device 106 via signaling channel 118.

The notification messages are addressed in a manner that causes application process 109 on mobile device 106 to open and process the received message. For example, a typical action taken by application process 109 after receiving a notification message is to request that the user scan their fingerprint on mobile device 106. Application process 109 then reports the results of the fingerprint scan back to authentication service 104. It will be understood that other actions may also or alternatively be taken by application process 109 after receiving the notification message, such as requesting the user to provide other biometric data (e.g., facial recognition, iris scan, heart monitoring, voice recognition, etc.), to enter a PIN or password, or to provide other information.

Application process 109 may or may not acknowledge any of the notification messages it receives by the various channels. Once application process 109 receives an input from the user in response to the action triggered by the notification message, application process 109 can select either cellular data network 114, WiFi channel 112, SMS network 117, or any two, or all three channels to respond to authentication service 104. Application process 109 may send a response to a notification message via Internet 111 and data channels 112 or 115. Internet 111 sends the response as data 119 directly to authentication service 104 bypassing the notification service 108. Responses sent via cellular data network 114 are communicated to authentication service 104 by sending data 120 through Internet 111 using known protocols. Accordingly, the notification message and the corresponding response take different paths. Responses sent via SMS network 117 are forwarded directly to authentication service 104. However, successful message delivery via one channel does not ensure successful delivery over the other channel.

Authentication service 104 will act on only one of the responses if two or more responses are received from application process 109. For example, authentication service 104 may act upon the first-received response by providing an appropriate response to application 101 on corporate system 102.

Multiple paths may be used to deliver a notification message and to receive the corresponding response. These paths use separate channels and different technologies that are affected differently by variations in radio coverage quality. As such, the dual notification solution provides a robust delivery and response mechanism to cover a wide variety of conditions.

FIG. 2 is a flowchart illustrating an example process for providing dual notifications to a mobile device. In step 201, an identifier for a target mobile device is received. The identifier may be received at an authentication service 104, such as described in FIG. 1 above. The identifier may be sent from an application 101 on an enterprise network 102, for example. In step 202, a request is sent to a notification service. The request directs the notification service to send a first notification to the target mobile device via a data channel. The notification service may send the first notification over a data channel that is established across either a wireless local area network, such as a WiFi network, or a cellular data network or both. The notification service may make its own determination as to which data channel to use to send the first notification or it may be directed to send the first notification over a specific data channel.

In step 203, a second notification is sent to the target mobile device via a second channel. The first notification and second notification are sent in parallel. The second channel may be, for example, a SMS channel and the second notification may be a binary SMS message.

The first notification and the second notification may comprise a token that allows an application on the target mobile device to validate a source of the notification. The source of the notification may be, for example, an application 101 on an enterprise network 102. The first notification and the second notification may comprise a token that allows an application to identify all notifications for a same event arriving over different channels. The first notification and the second notification may comprise a token that allows an application to identify all notifications for a same event arriving at separate times. This would allow the receiving application to identify multiple notifications for the same event and to respond only to the first received notification for that event. The token in the notification may be encrypted.

In step 204, a response to the first notification or the second notification is received via one or more channels. The response may be received at an authentication service 104, for example. The response may be received via one or more of a wireless local area network, a cellular data network, and a SMS network. The response may comprise a token that allows a receiving application to validate a source of the notification response.

Some embodiments of systems and methods for providing dual notifications to a mobile device, as described herein, may be implemented or executed, at least in part, by one or more computer systems. One such computer system is illustrated in FIG. 3. In various embodiments, computer system 300 may be a server, a mainframe computer system, a network appliance, a workstation, a network computer, a desktop computer, a laptop, a tablet, a handheld device, a mobile device, a smartphone, or the like. For example, in some cases, the corporate system 101, authentication service 104, notification services 108, and mobile device 105 as shown in FIG. 1 may include at least one computer such as computer system 300. As explained above, in different embodiments these various computer systems may be configured to communicate with each other in any suitable way, such as, for example, via various networks.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol, including wireless local area networks, WiFi connections 112, mobile and cellular data networks 114, and SMS network 117.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 and 2. Program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations including virtual configurations.

It should be understood that the various operations described herein, particularly in connection with FIGS. 1 and 2, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A system, comprising:
   a third party server hosting an application;
   a target mobile device; and
   an authentication server comprising at least one processor and a memory coupled to the at least one processor, the memory storing program instructions executable by the at least one processor to cause the computer system to:
   receive an identifier for the target mobile device from the third party server;
   send a request to send a first authentication token to the target mobile device via a data channel; and
   send a second authentication token to the target mobile device via a second channel, wherein said first authentication token and said second authentication token are sent in parallel and are associated with a same event;
   wherein act, by the application on the target mobile device, on one of the first or second authentication token that is received first, and ignore the other of the first or second authentication token that is received afterwards;
   receive, from the target mobile device, a response verifying that the target mobile device is authenticated to communicate with the third party server; and
   send a signal to the third party server which enables the application on the target mobile device to communicate with the application on the third party server.

2. The system of claim 1, wherein the data channel is established across one or more of a wireless local area network and a cellular data network, and wherein said second channel is a Short Message Service (SMS) channel.

3. The system of claim 1, wherein said token allows the application on the target mobile device to do one or more of: validate a source identity of the authentication token, and identify all authentication tokens for a same event arriving at separate times.

4. The system of claim 1, wherein the program instructions further cause the computer system to:
   receive a response to said first authentication token or said second authentication token via one or more of a wireless local area network, a cellular data network, and a Short Message Service (SMS) network.

* * * * *